United States Patent
Wang

(10) Patent No.: US 10,401,989 B2
(45) Date of Patent: Sep. 3, 2019

(54) TOUCH ELECTRODE STRUCTURE, TOUCH PANEL AND DISPLAY APPARATUS

(71) Applicant: BOE TECHNOLOGY GROUP CO., LTD., Beijing (CN)

(72) Inventor: MingHsi Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/203,726

(22) Filed: Jul. 6, 2016

(65) Prior Publication Data

US 2017/0102794 A1 Apr. 13, 2017

(30) Foreign Application Priority Data

Oct. 8, 2015 (CN) .......................... 2015 1 0644879

(51) Int. Cl.
*G06F 3/041* (2006.01)
*G06F 3/044* (2006.01)

(52) U.S. Cl.
CPC .............. G06F 3/041 (2013.01); G06F 3/044 (2013.01)

(58) Field of Classification Search
CPC ......... G06F 3/041; G06F 3/044; G06F 3/0412
USPC ........................................................ 345/173
See application file for complete search history.

(56) References Cited

U.S. PATENT DOCUMENTS

| | | |
|---|---|---|
| 7,098,897 B2 | 8/2006 | Vakil et al. |
| 2012/0262419 A1* | 10/2012 | Hershman ............... G06F 3/044 345/174 |
| 2013/0093724 A1* | 4/2013 | Liu ........................ G06F 3/0412 345/174 |
| 2015/0242017 A1* | 8/2015 | Liao ........................ G06F 3/044 345/174 |
| 2015/0331526 A1* | 11/2015 | Hashida .................. G06F 3/044 345/174 |
| 2015/0338943 A1* | 11/2015 | Donnelly ................ G06F 3/041 345/173 |
| 2016/0320879 A1* | 11/2016 | Hashida .................. G06F 3/044 |

FOREIGN PATENT DOCUMENTS

| | | |
|---|---|---|
| CN | 101393503 A | 3/2009 |
| CN | 201438300 U | 4/2010 |
| CN | 201465069 U | 5/2010 |
| CN | 101853116 A | 10/2010 |

OTHER PUBLICATIONS

First Chinese Office Action dated Jul. 20, 2017, for corresponding Chinese Application No. 201510644879.8.

* cited by examiner

*Primary Examiner* — Yuzhen Shen

(74) *Attorney, Agent, or Firm* — Kinney & Lange, P.A.

(57) ABSTRACT

The present disclosure discloses a touch electrode structure, a touch panel and a display apparatus. In one embodiment, the touch electrode structure includes a plurality of touch electrodes disposed in a same layer, and the touch electrodes are connected end to end and sequentially to form a continuous polygonal line. This touch electrode structure may be applicable to touch panels of any shapes, which may reduce a design duration of the touch electrode structure and the cost of manufacturing the touch panel.

12 Claims, 4 Drawing Sheets

TOUCH ELECTRODE STRUCTURE, TOUCH PANEL AND DISPLAY APPARATUS

CROSS-REFERENCE TO RELATED APPLICATION

This application claims the benefit of Chinese Patent Application No. 201510644879.8 filed on Oct. 8, 2015 in the State Intellectual Property Office of China, the whole disclosure of which is incorporated herein by reference.

BACKGROUND

1. Technical Field

Embodiments of the present invention relate to the field of display technology, and particularly to a touch electrode structure, a touch panel and a display apparatus.

2. Description of the Related Art

At present, touch panel's application fields become increasingly wide, and, the touch panels used in different application fields have different shapes. The touch panels of all shapes are required to be designed with various touch electrode structures of different patterns. As a result, design for touch electrode structure has a relatively long duration, and the cost for manufacturing a touch panel is relatively high.

Therefore, for those skilled in the art, it is a technical problem to be solved urgently how to provide a touch electrode structure which is applicable to these touch panels of any shapes.

SUMMARY

Embodiments of the present invention provide a touch electrode structure, comprising a plurality of touch electrodes disposed in a same layer, wherein, the touch electrodes are connected end to end and sequentially to form a continuous polygonal line.

According to a first embodiment of the present invention, there provides a touch panel, comprising the abovementioned touch electrode structure according to embodiments of the present invention, and a touch chip electrically connected to two of the touch electrodes positioned in both ends of the polygonal line of the touch electrode structure; wherein, break points where any two adjacent ones of the touch electrodes in the touch electrode structure are joined are positioned within a marginal region of the touch panel; and the touch chip is for loading a touch signal onto one of the two of the touch electrodes positioned in both ends of the polygonal line of the touch electrode structure and detecting a voltage signal, that is coupled to the touch signal, transmitted on the other of the two of the touch electrodes.

According to the first embodiment of the present invention, there also provides a display apparatus comprising the abovementioned touch panel according to the first embodiment of the present invention.

According to a second embodiment of the present invention, there provides a touch panel comprising a first touch electrode structure and a second touch electrode structure overlapped with each other, a first touch chip electrically connected to two of the touch electrodes positioned in both ends of the polygonal line of the first touch electrode structure, and, a second touch chip electrically connected to two of the touch electrodes positioned in both ends of the polygonal line of the second touch electrode structure; wherein, both the first touch electrode structure and the second touch electrode structure are the abovementioned ones according to embodiments of the present invention, first break points where any two adjacent ones of the touch electrodes in the first touch electrode structure are joined are positioned within a marginal region of the touch panel, and, second break points where any two adjacent ones of the touch electrodes in the second touch electrode structure are joined are positioned within the marginal region of the touch panel;

the touch electrodes of the first touch electrode structure and the touch electrodes of the second touch electrode structure are intersected;

the first touch chip is for loading a touch signal onto one of the two of the touch electrodes positioned in both ends of the polygonal line of the first touch electrode structure and detecting a voltage signal, that is coupled to the touch signal, transmitted on the other of the two of the touch electrodes; and, the second touch chip is for loading a touch signal onto one of the two of the touch electrodes positioned in both ends of the polygonal line of the second touch electrode structure and detecting a voltage signal, that is coupled to the touch signal, transmitted on the other of the two of the touch electrodes.

According to the second embodiment of the present invention, there also provides a display apparatus comprising the abovementioned touch panel according to the second embodiment of the present invention.

DETAILED DESCRIPTION OF THE EMBODIMENTS

These exemplary embodiments of a touch electrode structure, a touch panel and a display apparatus according to embodiments of the present invention will be described hereinafter in detail in conjunction with the attached drawings.

Figure 1:
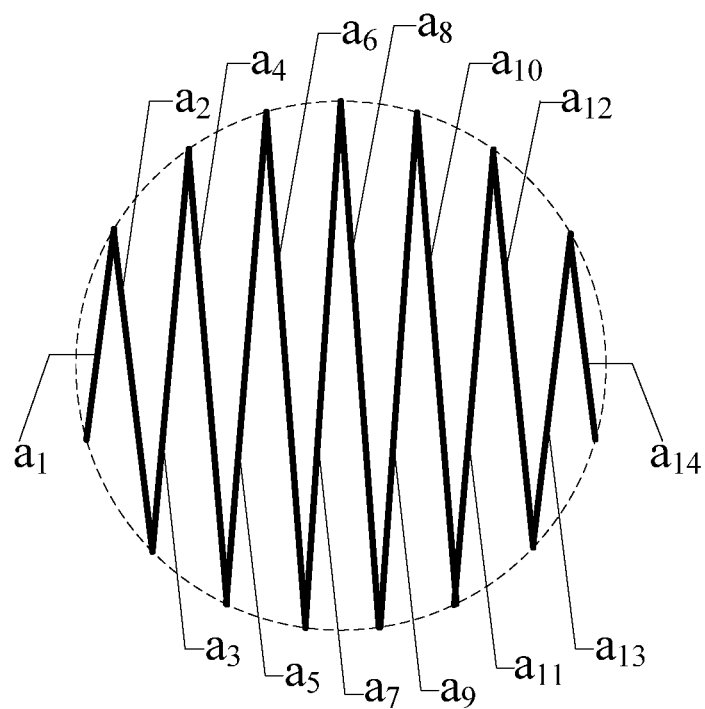
FIGS. 1-3 are schematic structural views of touch electrode structures according to these embodiments of the present invention, respectively.
Figure 2:
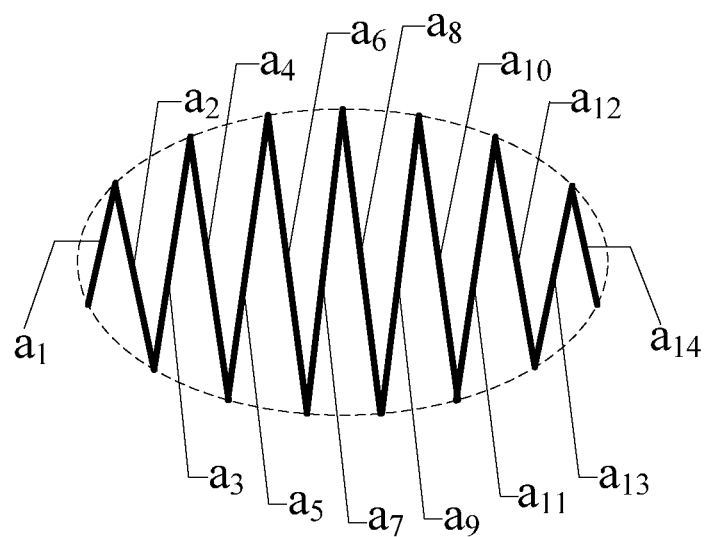
Figure 3:
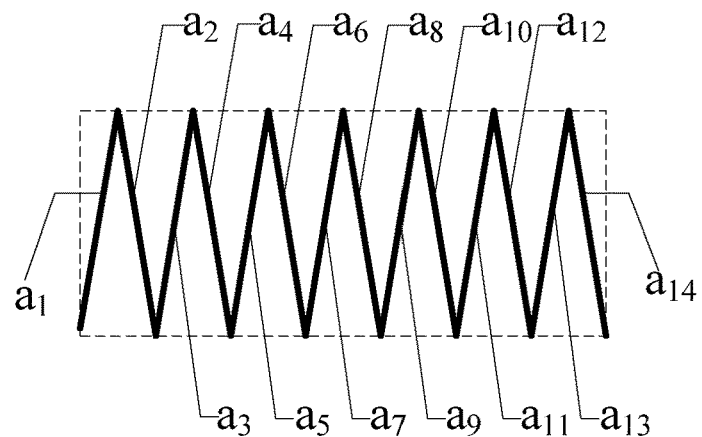

Embodiments of the present invention provide a touch electrode structure, referring to FIG. 1 to FIG. 3, it comprises a plurality of touch electrodes $a_1$-$a_{14}$ (an example in which 14 touch electrodes $a_1$-$a_{14}$ are provided is shown in FIG. 1 to FIG. 3) disposed in a same layer, wherein, the touch electrodes $a_1$-$a_{14}$ are connected end to end and sequentially to form a continuous polygonal line.

The abovementioned touch electrode structure according to embodiments of the present invention may be applicable to touch panels of any shapes, which may reduce a design duration of the touch electrode structure and the cost of manufacturing the touch panel. For example, the touch electrode structure shown in FIG. 1 may be applicable to a touch panel of circular shape, the touch electrode structure shown in FIG. 2 may be applicable to a touch panel of oval shape, and, the touch electrode structure shown in FIG. 3 may be applicable to a touch panel of rectangular shape. Here, in FIG. 1 to FIG. 3, shapes of the touch panels are defined with dotted lines, for identification purpose. It should be noted that, the abovementioned touch electrode structure according to embodiments of the present invention may be applicable to touch panels of any other shapes including irregular shapes, and there is no limitation on this herein.

It should be explained that, in the abovementioned touch electrode structure according to embodiments of the present invention, material for these touch electrodes may be metal, or Transparent Conducting Oxide (TCO), for example, Indium Tin Oxides (ITO), and there is no limitation on this herein.

Preferably, in the abovementioned touch electrode structure according to embodiments of the present invention, as shown in FIG. 1 to FIG. 3, these touch electrodes $a_1$-$a_{14}$ may be formed as linear electrodes. As a result, difficulty level of manufacture of these touch electrodes $a_1$-$a_{14}$ may be reduced, while accuracy of determining positions of touch points may be improved.

Moreover, in the abovementioned touch electrode structure according to embodiments of the present invention, angles between any two adjacent ones of the touch electrodes may be provided to be equal to one another. In this way, degrees of touch control accuracy of a touch panel may be uniform if the abovementioned touch electrode structure according to embodiments of the present invention is applied to the touch panel.

Of course, in the abovementioned touch electrode structure according to embodiments of the present invention, angles between any two adjacent ones of the touch electrodes may be different, and there is no limitation on this herein. Specifically, angles between any two adjacent ones of the touch electrodes may be provided in accordance with requirements on degrees of touch control accuracy of different positions in the touch panel.

In exemplary implementations, in the abovementioned touch electrode structure according to embodiments of the present invention, the greater is density of provision of the touch electrodes and the less are angles between any two adjacent ones of the touch electrodes, the greater is touch control accuracy of the touch panel. Preferably, angles between any two adjacent ones of the touch electrodes are provided to be in a range that is greater than 0° but is less than or equal to 30°. In this way, high degrees of touch control accuracy of a touch panel may be ensured if the abovementioned touch electrode structure according to embodiments of the present invention is applied to the touch panel. Specifically, angles between any two adjacent ones of the touch electrodes may be provided in accordance with actual requirements on degrees of touch control accuracy of the touch panel.

Figure 4:
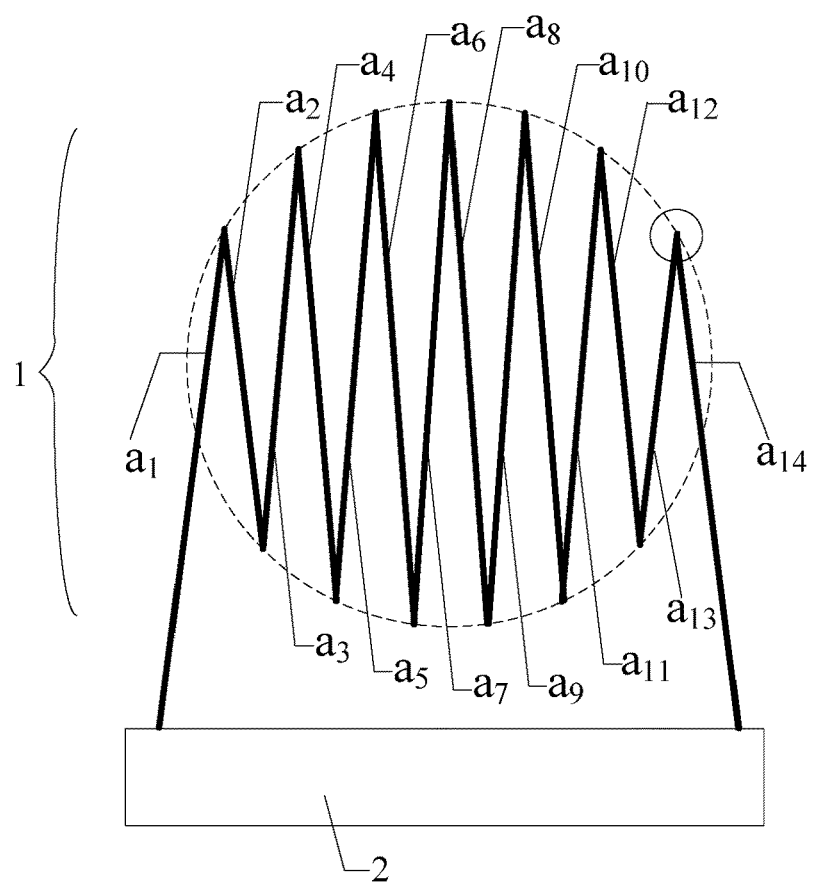
FIG. 4 is a schematic structural view of a touch panel according to a first embodiment of the present invention.

Based on the same invention concept, a touch panel is provided in a first embodiment of the present invention. Referring to FIG. 4, the touch panel comprises the abovementioned touch electrode structure 1 (the one shown in FIG. 1 is taken as an example) according to the embodiments of the present invention, and a touch chip 2 electrically connected to two touch electrodes $a_1$ and $a_{14}$ respectively positioned in both ends of the polygonal line of the touch electrode structure 1.

Break points (shown in solid circle of FIG. 4) where any two adjacent ones of the touch electrodes in the touch electrode structure 1 are joined are positioned within a marginal region of the touch panel. This touch electrode structure 1 may be applicable to touch panels of any shapes.

The touch chip 2 is for loading a touch signal onto one of the two touch electrodes $a_1$ and $a_{14}$ positioned in both ends of the polygonal line in the touch electrode structure 1 and detecting a voltage signal, which is coupled to the touch signal, transmitted on the other of the two.

The abovementioned touch panel according to the first embodiment of the present invention includes only one layer of the touch electrode structure, which may enable single-point touch controlling function and single point slide touch controlling function, and thus this touch panel has a relatively small thickness. Moreover, the touch electrode structure included in the touch panel may be applicable to touch panels of any shapes, which may reduce design duration of the touch electrode structure and the cost of manufacturing the touch panel. In addition, in this touch panel, only two terminals are required to be provided for electrical connecting the touch electrode structure to the touch chip, which achieves a simple provision of the terminals.

In an exemplary implementation, the abovementioned touch panel according to the first embodiment of the present invention may further comprise a first substrate and a second substrate disposed opposite to each other. Specifically, the abovementioned touch panel according to the first embodiment of the present invention may be used as In Cell touch panel, for example, the touch electrode structure is positioned at a side of the first substrate facing the second substrate, or, the touch electrode structure is positioned at a side of the second substrate facing the first substrate. Alternatively, the abovementioned touch panel according to the first embodiment of the present invention may be used as On Cell touch panel or Add on Mode touch panel, for example, the touch electrode structure is positioned at a side of the second substrate away from the first substrate. And, there is no limitation on this herein.

It should be explained that, the abovementioned touch panel according to the first embodiment of the present invention is particularly applicable to the field of flexible displaying, namely, both the first substrate and the second substrate are flexible substrates, and, the touch panel may be of any shapes, and there is no limitation on this herein.

Based on the same invention concept, a display apparatus is provided in the first embodiment of the present invention. The display apparatus comprises the abovementioned touch panel according to the first embodiment of the present invention. The display apparatus may be any of products or components having a displaying function, including a mobile phone, a tablet computer, a television set, a display, a note computer, a digital frame, a navigating instrument, etc. The display apparatus according to the first embodiment of the present invention, especially applicable to smartwatch, may enable single-point touch controlling function and single point slide touch controlling function, own a design of any shapes, and have a relatively small thickness. Implementations of the display apparatus may refer to the abovementioned first embodiment of the touch panel, and thus are omitted for clarity purpose.

Figure 5A:
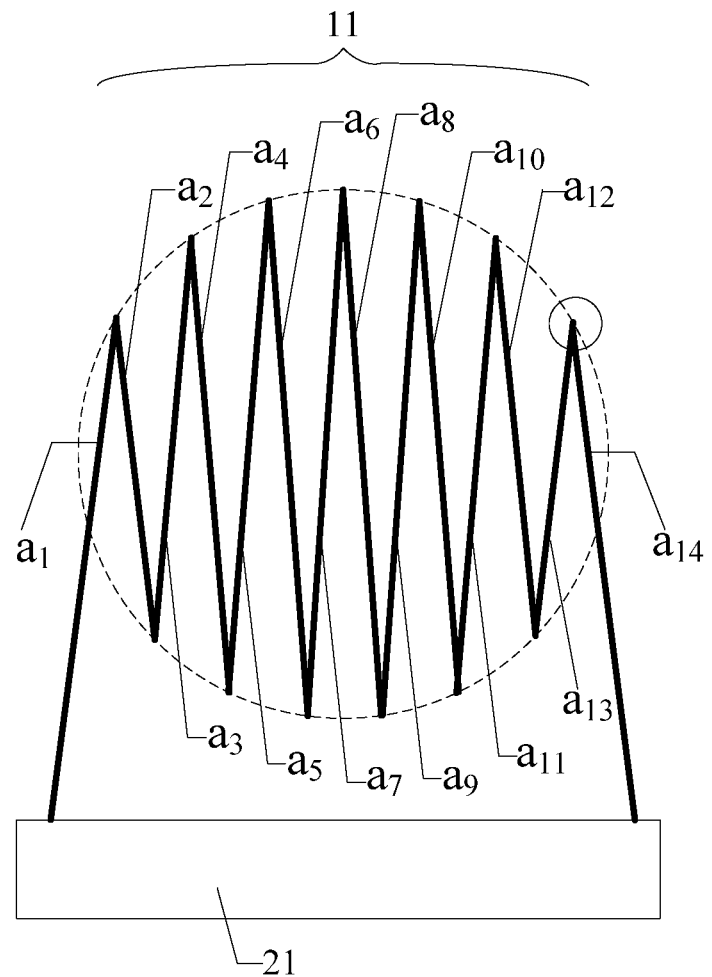
FIG. 5a and FIG. 5b are schematic structural views of two portions overlapped in a touch panel according to a second embodiment of the present invention, respectively.
Figure 5B:
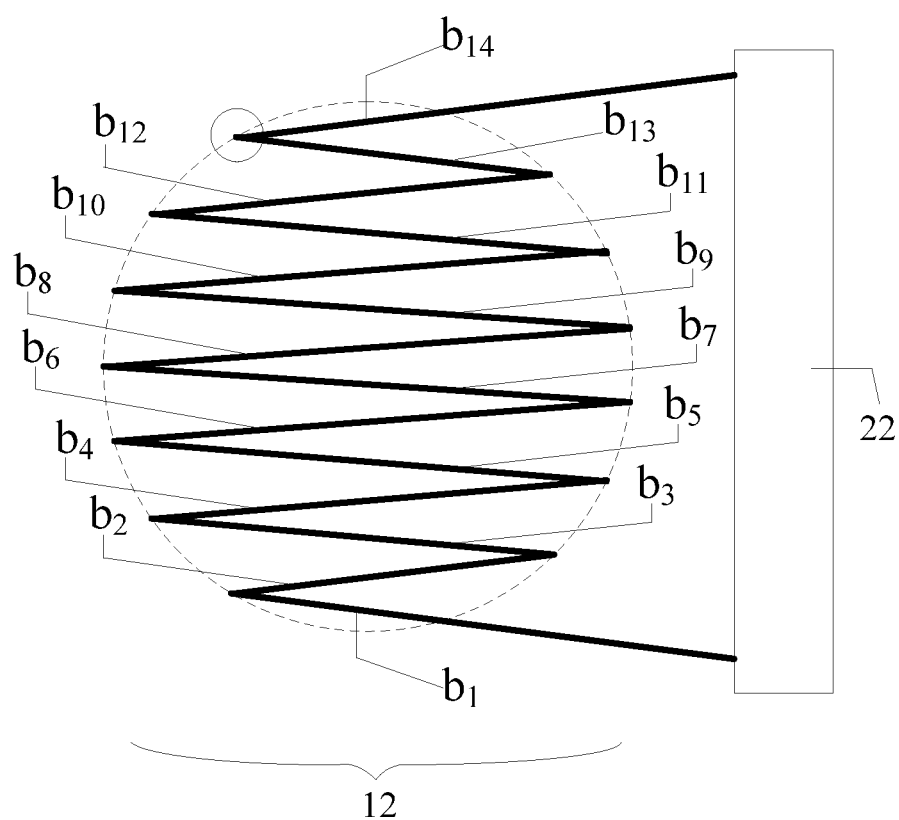

Based on the same invention concept, a touch panel is provided in a second embodiment of the present invention. The touch panel comprises a first touch electrode structure 11 (as shown in FIG. 5a) and a second touch electrode structure 12 (as shown in FIG. 5b) overlapped with each other, a first touch chip 21 (as shown in FIG. 5a) electrically connected to two touch electrodes $a_1$ and $a_{14}$ positioned in both ends of the polygonal line of the first touch electrode structure 11, and, a second touch chip 22 (as shown in FIG. 5b) electrically connected to two touch electrodes $a_1$ and $a_{14}$ positioned in both ends of the polygonal line of the second touch electrode structure 12. Wherein, both the first touch electrode structure 11 and the second touch electrode structure 12 are the abovementioned touch electrode structure 1

(the one shown in FIG. 1 is taken as an example) according to the embodiments of the present invention. First break points (shown in solid circle of FIG. 5a) where any two adjacent ones of the touch electrodes in the first touch electrode structure 11 are joined are positioned within a marginal region of the touch panel, and, second break points 12 (shown in solid circle of FIG. 5b) where any two adjacent ones of the touch electrodes in the second touch electrode structure 12 are joined are positioned within the marginal region of the touch panel. The first touch electrode structure 11 and the second touch electrode structure 12 are applicable to these touch panels of any shapes The touch electrodes $a_1$-$a_{14}$ of the first touch electrode structure 11 and the touch electrodes $b_1$-$b_{14}$ of the second touch electrode structure 12 are intersected. FIG. 5a and FIG. 5b show an example in which the touch electrodes $a_1$, $a_3$, $a_5$, $a_7$, $a_9$, $a_{11}$, $a_{13}$ and the touch electrodes $b_1$, $b_3$, $b_5$, $b_7$, $b_9$, $b_{11}$, $b_{13}$ are intersected perpendicularly, while the touch electrodes $a_2$, $a_4$, $a_6$, $a_8$, $a_{10}$, $a_{12}$, $a_{14}$ and the touch electrodes $b_2$, $b_4$, $b_6$, $b_8$, $b_{10}$, $b_{12}$, $b_{14}$ are intersected perpendicularly.

The first touch chip 21 is for loading a touch signal onto one of two touch electrodes $a_1$ and $a_{14}$ positioned in both ends of the polygonal line of the first touch electrode structure 11 and detecting a voltage signal, that is coupled to the touch signal, transmitted on the other of the two.

The second touch chip 22 is for loading a touch signal onto one of two touch electrodes $b_1$ and $b_{14}$ positioned in both ends of the polygonal line of the second touch electrode structure 12 and detecting a voltage signal, that is coupled to the touch signal, transmitted on the other of the two.

The display panel according to the second embodiment of the present invention includes two layers of touch electrode structures overlapped with each other. The two layers of touch electrode structures are for determining coordinates of a touch point along an X direction and a Y direction, respectively, which achieves a multi-point touch controlling function. If a density of provisions of the touch electrodes in these touch electrode structures is great enough, a fingerprint identification function may be achieved. Moreover, the touch electrode structure used in the touch panel may be applicable to the touch panels of any shapes, which may reduce design duration of the touch electrode structure and the cost of manufacturing the touch panel. In addition, in this touch panel, only four terminals are required to be provided for electrical connecting the touch electrode structures to the touch chips, which achieves a simple provision of the terminals.

In an exemplary implementation, the abovementioned touch panel according to the second embodiment of the present invention may further comprise a first substrate and a second substrate disposed opposite to each other. The first touch electrode structure may be positioned at a side of the first substrate facing the second substrate; or, the first touch electrode structure may be positioned at a side of the second substrate facing the first substrate; or, the first touch electrode structure may also be positioned at a side of the second substrate away from the first substrate; and, there is no limitation on this herein. Similarly, the second touch electrode structure may be positioned at a side of the first substrate facing the second substrate; or, the second touch electrode structure may be positioned at a side of the second substrate facing the first substrate; or, the second touch electrode structure may also be positioned at a side of the second substrate away from the first substrate; and, there is no limitation on this herein. Specifically, if both the first touch electrode structure and the second touch electrode structure are positioned at the side of the first substrate facing the second substrate or the side of the second substrate facing the first substrate, the abovementioned touch panel according to the second embodiment of the present invention may be used as In Cell touch panel. If both the first touch electrode structure and the second touch electrode structure are positioned at the side of the second substrate away from the first substrate, the abovementioned touch panel according to the second embodiment of the present invention may be used as On Cell touch panel or Add on Mode touch panel.

It should be explained that, the abovementioned touch panel according to the second embodiment of the present invention is particularly applicable to the field of flexible displaying, namely, both the first substrate and the second substrate are flexible substrates, and, the touch panel may be of any shapes, and there is no limitation on this herein.

Based on the same invention concept, a display apparatus is also provided in the second embodiment of the present invention. The display apparatus comprises the abovementioned touch panel according to the second embodiment of the present invention. The display apparatus may be any of products or components having a displaying function, including a mobile phone, a tablet computer, a television set, a display, a note computer, a digital frame, a navigating instrument, etc. Implementations of the display apparatus may refer to the abovementioned second embodiment of the touch panel, and thus are omitted for clarity purpose.

Embodiments of the present invention provide a touch electrode structure, a touch panel and a display apparatus. The touch electrode structure comprises a plurality of touch electrodes disposed in a same layer, wherein, the touch electrodes are connected end to end and sequentially to form a continuous polygonal line. This touch electrode structure may be applicable to touch panels of any shapes, which may reduce a design duration of the touch electrode structure and the cost of manufacturing the touch panel.

Obviously, it would be appreciated by those skilled in the art that various changes or modifications may be made without departing from the principles and spirit of the present invention. Accordingly, the present invention intends to contain these changes or modifications if they fall into the scope which is defined in the claims and their equivalents of the present invention.

What is claimed is:

1. A touch panel, comprising:
    a touch electrode structure, comprising a plurality of touch electrodes disposed in a same layer, wherein,
        all of the touch electrodes in the same layer are connected end to end and sequentially to form one continuous polygonal line;
        break points where any two adjacent ones of the touch electrodes in the touch electrode structure are connected are positioned within a marginal region of the touch electrode structure; and
        the marginal region of the touch electrode structure has substantially annular shape, and all of the break points are positioned in the same edge of the substantially annular shape; and
    a touch chip electrically connected to two of the touch electrodes positioned in both ends of the polygonal line of the touch electrode structure; wherein,
        the touch chip is for loading a touch signal onto one of the two of the touch electrodes positioned in both ends of the polygonal line of the touch electrode structure and detecting a voltage signal, which is coupled to the touch signal, transmitted on the other of the two of the touch electrodes.

2. The touch panel of claim 1, further comprising: a first substrate and a second substrate disposed opposite to each other; wherein,
the touch electrode structure is positioned at a side of the first substrate facing the second substrate; or, the touch electrode structure is positioned at a side of the second substrate facing the first substrate; or, the touch electrode structure is positioned at a side of the second substrate away from the first substrate.

3. A display apparatus, comprising a touch panel of claim 1.

4. The touch panel of claim 1, wherein, in the touch electrode structure, each of the touch electrodes is a linear electrode.

5. The touch panel of claim 4, wherein, angles between any two adjacent ones of the touch electrodes are equal to one another.

6. The touch panel of claim 5, wherein, each of the angles between any two adjacent ones of the touch electrodes is greater than 0° but is less than or equal to 30°.

7. A touch panel, comprising a first touch electrode structure and a second touch electrode structure overlapped with each other, both the first touch electrode structure and the second touch electrode structure, a first touch chip electrically connected to two of the touch electrodes positioned in both ends of the polygonal line of the first touch electrode structure, and, a second touch chip electrically connected to two of the touch electrodes positioned in both ends of the polygonal line of the second touch electrode structure; wherein,
each of the first touch electrode structure and the second touch electrode structure comprises a plurality of touch electrodes disposed in a same layer, wherein, all of the touch electrodes in the same layer are connected end to end and sequentially to form one continuous polygonal line; break points where any two adjacent ones of the touch electrodes in the touch electrode structure are connected are positioned within a marginal region of the touch electrode structure; and the marginal region of the touch electrode structure has a substantially annular shape, and all of the break points are positioned in a same edge of the substantially annular shape;
first break points where any two adjacent ones of the touch electrodes in the first touch electrode structure are joined are positioned within a marginal region of the touch panel, and, second break points where any two adjacent ones of the touch electrodes in the second touch electrode structure are joined are positioned within the marginal region of the touch panel;
the touch electrodes of the first touch electrode structure and the touch electrodes of the second touch electrode structure are intersected;
the first touch chip is for loading a touch signal onto one of the two of the touch electrodes positioned in both ends of the polygonal line of the first touch electrode structure and detecting a voltage signal, that is coupled to the touch signal, transmitted on the other of the two of the touch electrodes; and,
the second touch chip is for loading a touch signal onto one of the two of the touch electrodes positioned in both ends of the polygonal line of the second touch electrode structure and detecting a voltage signal, that is coupled to the touch signal, transmitted on the other of the two of the touch electrodes.

8. The touch panel of claim 7, further comprising: a first substrate and a second substrate disposed opposite to each other; wherein,
the first touch electrode structure is positioned at a side of the first substrate facing the second substrate; or, the first touch electrode structure is positioned at a side of the second substrate facing the first substrate; or, the first touch electrode structure is positioned at a side of the second substrate away from the first substrate; and,
the second touch electrode structure is positioned at a side of the first substrate facing the second substrate; or, the second touch electrode structure is positioned at a side of the second substrate facing the first substrate; or, the second touch electrode structure is positioned at a side of the second substrate away from the first substrate.

9. A display apparatus, comprising a touch panel of claim 7.

10. The touch panel of claim 7, wherein, in the touch electrode structure, each of the touch electrodes is a linear electrode.

11. The touch panel of claim 10, wherein, angles between any two adjacent ones of the touch electrodes are equal to one another.

12. The touch panel of claim 11, wherein, each of the angles between any two adjacent ones of the touch electrodes is greater than 0° but is less than or equal to 30°.

* * * * *